(No Model.)
G. HEWETT.
GALVANIC BATTERY.
No. 522,983. Patented July 17, 1894.
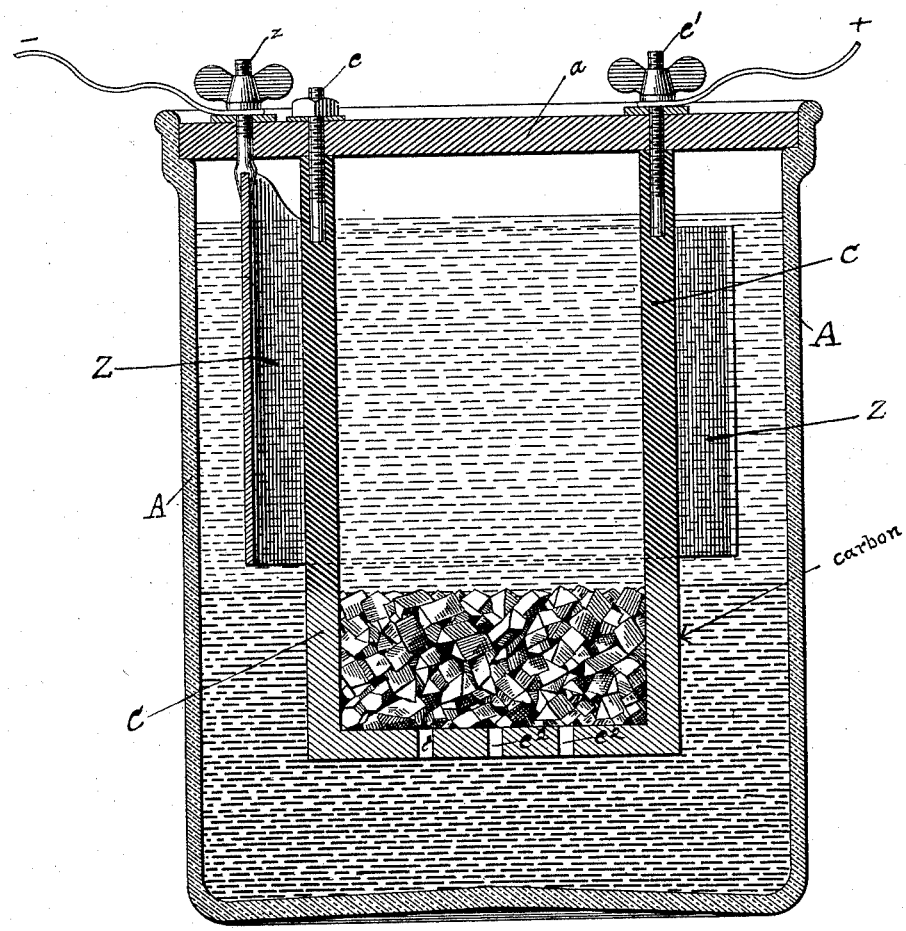
WITNESSES:
Frank S. Ober
C. V. Edwards.
INVENTOR
Gardner Hewett
BY
M. A. Rosenbaum
ATTORNEY

UNITED STATES PATENT OFFICE.

GARDNER HEWETT, OF NEW YORK, N. Y., ASSIGNOR OF FOUR-FIFTHS TO WM. HEATON LONGSDORF, OF SAME PLACE.

GALVANIC BATTERY.

SPECIFICATION forming part of Letters Patent No. 522,983, dated July 17, 1894.

Application filed September 19, 1893. Serial No. 485,896. (No model.)

*To all whom it may concern:*

Be it known that I, GARDNER HEWETT, a citizen of the United States, residing at New York, in the county of New York and State of New York, have invented certain new and useful Improvements in Galvanic Batteries, of which the following is a full, clear, and exact description.

My invention relates to galvanic batteries and has special reference to that type known as the "gravity."

The objects sought to be attained are to produce a battery giving a large current for a long period of time; cheap and simple to construct and in which the elements are so arranged and constructed as to maintain a well defined "gravity line." These objects I accomplish by the use of an excitant and depolarizing agent in connection with a certain construction, arrangement and combination of parts which will be fully pointed out in the description which follows.

In the accompanying drawing, the figure represents a vertical central section of a battery cell constructed in accordance with my invention.

Referring to the drawing by letter, A represents the containing jar or vessel and $a$ its cover, preferably of non-conducting material. The latter supports both electrodes of the cell. In this battery the positive electrode is zinc while the negative, as usual, is of carbon. The carbon is in the form of a vessel or cup C centrally secured to the cover $a$ by means of two screws $c$, $c'$, one of which is provided with a binding nut for connecting the line wire. The cup is a little more than three quarters of the height of the outer jar, so that when in position, there will be considerable space between the bottoms of the two vessels. The vessel C is made of dense carbon and is preferably treated from its upper end down to the gravity-line with paraffine or other material to make it impervious to liquids. Below the gravity line it is more or less porous, and the bottom is provided with a number of perforations $c^2$ to admit of free circulation between the outer and inner vessels.

The zinc Z, as shown, is in the form of a cylinder surrounding the cup and occupying the upper part of the jar, but it may be in any desired form. It is supported by a bolt $z$ passing up through the cover to which the positive wire is attached.

In assembling the cell I first place in the outer cell a solution of bisulphate of soda, the quantity being such as to nearly fill the cell when the electrodes are inserted. Then I place in the carbon cup bichromate of potash crystals, the quantity being such as to fill it to the gravity line, indicated by the lower limit of the portion treated with paraffine. The electrodes then being attached to the cover are inserted in the jar and the cell immediately becomes active. The soda solution in the outer vessel attacks and dissolves the crystals in the cup, forming a dense liquid which will fill both vessels up to the top level of the crystals in the carbon cup; the lighter liquids remain above this line.

It will be observed that the walls of the cup prevent agitation of the liquids and thus tend to maintain a definite gravity line and the battery will remain constant in strength for a long period.

I find that the use of bisulphate of soda in the outer vessel with bichromate of potash in the porous vessel is of particular value, as these materials coupled with the arrangement of the parts so that both the outer and inner surfaces of the carbon are active, give a very strong and lasting current, and it will be seen that I obtain this full use of the carbon surface by making the receptacle for the crystals of carbon.

It is to be understood that I claim an advantage in the use of the electrolytic materials herein mentioned, when used in any form of gravity cell, and I therefore do not confine myself to their use in connection with the construction of the electrodes herein described.

Having thus described my invention, I claim—

1. In a battery cell containing in its upper portion an exciting solution and below that a depolarizing solution of greater specific gravity, the combination of a positive and a negative element, the latter having the shape of a cup and extending into both solutions, the lower portion only of the cup containing a depolarizing agent, substantially as described.

2. In a gravity battery, a carbon cup porous at its lower end only and containing a soluble depolarizing agent in combination with an excitant solution outside of said cup.

3. In a gravity battery, a carbon porous cup containing bichromate of potash crystals in combination with a solution of bisulphate of soda outside the carbon porous cup.

4. In a battery cell containing in its upper portion an exciting solution and below that a depolarizing solution of greater specific gravity, a carbon cup containing a depolarizing agent in combination with an outer vessel, said carbon cup extending from the upper portion of the cell downward into both solutions and being provided with openings in its lower portion only, the cup being solid throughout in its upper portion.

In testimony whereof I subscribe my signature in presence of two witnesses.

GARDNER HEWETT.

Witnesses:
C. V. EDWARDS,
FRANK S. OBER.